US008283805B2

(12) United States Patent
Tan et al.

(10) Patent No.: US 8,283,805 B2
(45) Date of Patent: Oct. 9, 2012

(54) SCANNER WITH BATTERY

(75) Inventors: Hin Leong Tan, Sunnyvale, CA (US);
Chang-Ming Liu, Taichung (TW);
Cheng-Hsien Chang, Taichung (TW)

(73) Assignee: Electronic Document Technology Pte. Ltd., Singapore (SG)

( * ) Notice: Subject to any disclaimer, the term of this patent is extended or adjusted under 35 U.S.C. 154(b) by 580 days.

(21) Appl. No.: 12/077,389

(22) Filed: Mar. 17, 2008

(65) Prior Publication Data
US 2009/0230773 A1 Sep. 17, 2009

(51) Int. Cl.
*H02J 3/32* (2006.01)
*H02J 7/00* (2006.01)
*H01H 47/00* (2006.01)
(52) U.S. Cl. .............................. 307/52; 307/66; 307/126
(58) Field of Classification Search .................... 307/43, 307/87, 66, 52
See application file for complete search history.

(56) References Cited

U.S. PATENT DOCUMENTS

| 7,340,627 B1 * | 3/2008 | Harvey .......................... 713/330 |
| 7,402,981 B2 * | 7/2008 | May et al. ...................... 320/137 |
| 7,566,993 B2 * | 7/2009 | May ................................ 307/82 |
| 7,772,720 B2 * | 8/2010 | McGee et al. ................... 307/66 |
| 2006/0187689 A1 * | 8/2006 | Hartular .......................... 363/63 |
| 2007/0114849 A1 * | 5/2007 | Falik et al. ....................... 307/64 |

* cited by examiner

*Primary Examiner* — Michael Rutland Wallis
(74) *Attorney, Agent, or Firm* — Douglas L. Weller

(57) ABSTRACT

Power is provided to a scanning device. Power supplied by an attached bus is used to power the scanning device when power requirements for the scanning device can be met by the power supplied by the attached bus. Power is drawn from a rechargeable battery to supply power to the scanning device when power requirements for the scanning device cannot be met by the power from the attached bus. When the scanning device is in a stand-by mode, the power from the attached bus is used to recharge the rechargeable battery.

15 Claims, 3 Drawing Sheets

SCANNER WITH BATTERY

BACKGROUND

Optical scanners with a Universal Serial Bus (USB) interface can be roughly classified into two categories; those that are completely powered from their USB interface (USB powered), and those that operate on power from an external power source. The major advantage of USB powered scanners is that of portability. USB powered scanners do not require external power and so can be used practically anywhere that a portable computer (which has a USB port) can be set up. Compact optical card scanners, for example, are typically USB powered as portability is an important feature since the card scanners are used in a wide variety of field applications where external power is not readily available.

As the power available from the USB is limited, card scanners that are USB powered usually incorporate small motors that supply limited torque, which results in lower performance in terms of scanning speed. The advance of imaging technology and storage has fuelled the need for higher performance card scanners which require more power to operate. One example is the duplex card scanner that is capable of scanning front and back sides of a card in a single pass. Another example is a card scanner that uses a high energy stepper motor to propel thick rigid cards through the scanning path.

DESCRIPTION OF THE EMBODIMENT

Figure 1:
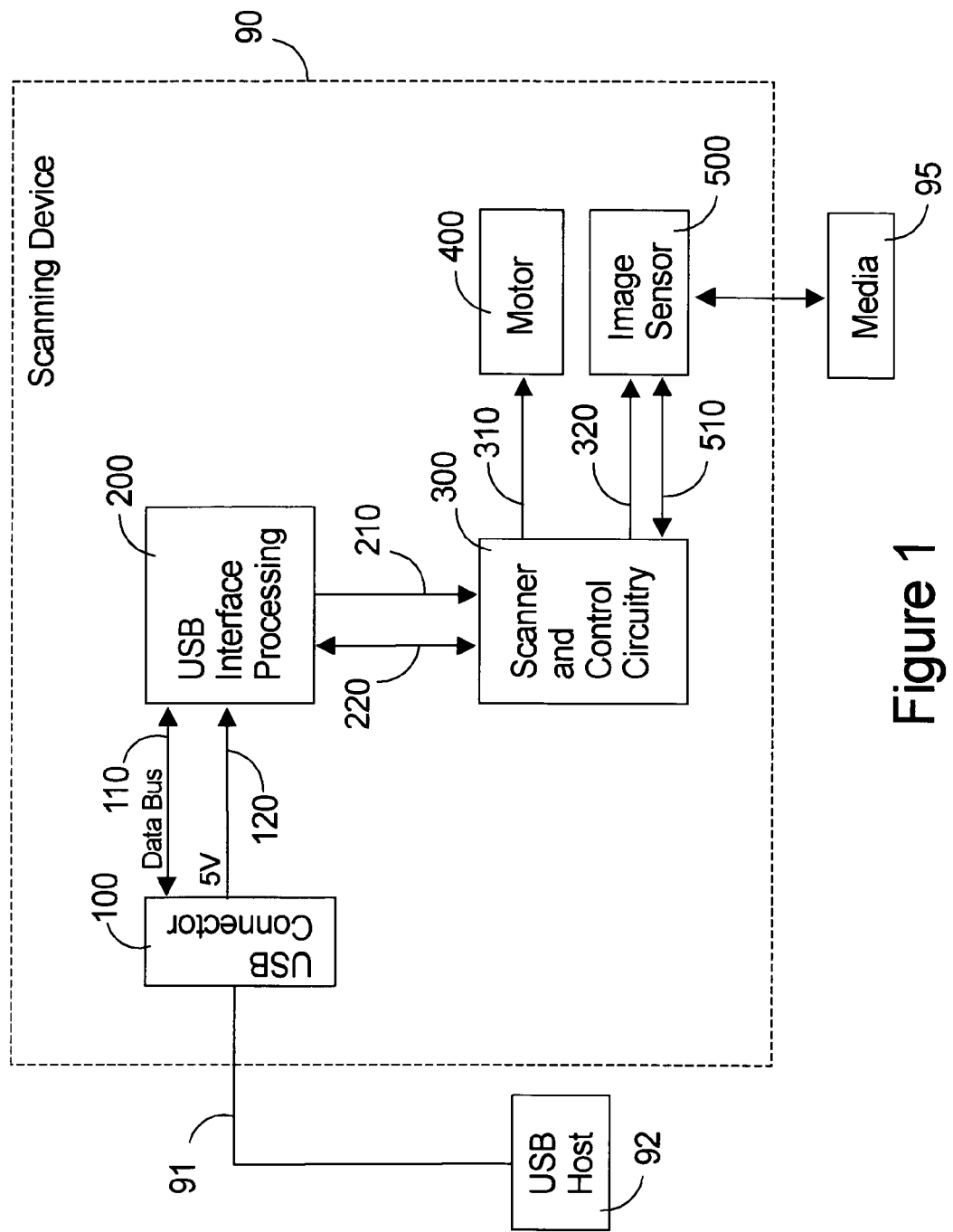
FIG. 1 shows a block diagram of a conventional USB powered scanning device.

FIG. 1 shows a block diagram of a typical conventional scanning device 90. Scanning device 90, through a Universal Serial Bus (USB) cable 91 is connected to a USB host 92. For example, USB host 92 is a host computer or some other device capable of hosting USB. Scanning device 90 operates on electrical power drawn from USB host 92 and provided through USB cable 91.

Scanning device 90 includes a USB connector 100 that links scanning device 90 externally to USB host 92 through USB cable 91. USB connector 100 is linked via a data bus 110 to USB interface processing circuitry 200. USB interface processing circuitry 200 manages various aspects of the USB interface between scanning device 90 and USB host 92. Power for scanning device 90 is drawn through USB connector 100 via a bus 120 which supplies a 5 volt (V) source with a maximum allowable current of 500 milliamps (mA), as specified according to USB standards. USB interface processing circuitry 200 is connected via a power bus 210 and a data bus 220 to scanner and control processing circuitry 300. Scanner and control processing circuitry 300 controls the different components of scanning device 90, and includes circuits to drive a motor 400, ROM and SRAM control (not shown), memory buffer (not shown) an analog to digital converter (not shown), clock signals (not shown), and communication with an image sensor 500.

Image sensor 500 is used to scan media 95. For duplex scanners, image sensor 500 typically includes two image sensor units that allows for scanning both sides of media 95. In some implementations (such as the National Semiconductor LM9833 scanner control chip or the Service & Quality SQ113 chipset), USB interface processing circuitry 200 and much of the scanner and control processing circuitry 300 are tightly integrated and form a single processing unit on a single chip.

Scanner and control processing circuitry 300 delivers power to motor 400 via a bus 310. Scanner and control processing circuitry 300 also delivers power and control signals via a bus 320 to image sensor 500, and retrieves scanned data via bus 510. Image sensor 500 typically includes a contact image sensor unit, which is an array of image sensor devices with an illumination source and focusing lens housed in a compact enclosure. For duplex scanning devices, image sensor 500 typically contains two contact image sensor units.

In operation, the conventional scanning device shown in FIG. 1 draws power from USB cable 91 when scanning device 90 is plugged into a USB port of USB host 92. The power supplied to scanning device 90 by USB host 92 is a 5V voltage source with a maximum allowable current of 500 mA, which is equivalent to a maximum power of 2.5 watts (W). During a scan operation in a typical scanning device, USB interface processing circuitry 200 and scanner and control processing circuitry 300 consume approximately 1.2 W of power, and image sensor module 500 when including only a single image sensor unit consumes approximately 0.5 W. This leaves a remainder allowable power of 0.8 W to drive motor 400. In a duplex scanning device which has two image sensor units, each consuming 0.5 W, the remaining power available to drive motor 400 is further reduced, which results in a significant limitation in the torque output of motor 400. In a sheet-fed scanner, this limits the ability of motor 400 to propel an input media through scanning device 90. The input media moves through a scanning path only at a low speed, or it may easily jam in scanning device 90 due to insufficient motor torque.

Figure 2:
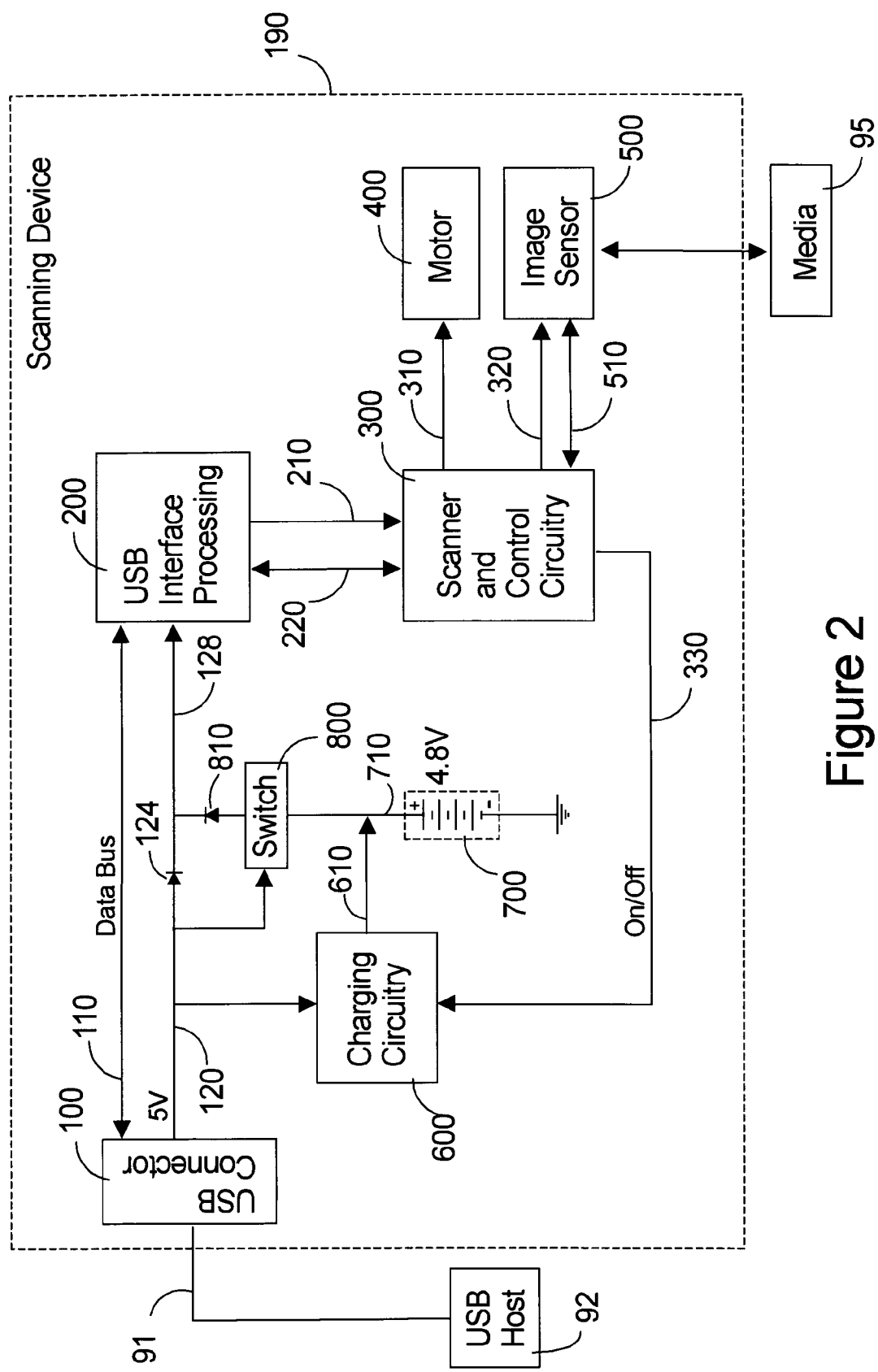
FIG. 2 shows a block diagram of an embodiment of a USB powered scanning device that operates on power drawn from a USB interface and from a rechargeable battery source in accordance with an embodiment of the invention.

FIG. 2 shows a block diagram of scanning device 90 shown in FIG. 1 after modification in accordance with an embodiment of the present invention. Scanning device 190 of FIG. 2 operates on power drawn from USB cable 91 and from a rechargeable battery 700. Battery 700 can be located, for example, within the main scanner housing or as an external attachment to scanning device 190.

As shown in FIG. 2, power is drawn from USB cable 91 via bus 120 which is connected through a low voltage diode 124 to a bus 128. Charging circuitry 600 draws power from bus 120. In one embodiment, charging circuitry 600 is a current limiting circuit which continuously charges battery 700, via an output bus 610. Output bus 610 is connected to a positive terminal 710 of battery 700. In another embodiment, charging circuitry 600 is a current limiting circuit that can be selectively enabled/disabled by a control signal on bus 330 from scanner and control circuitry 300. Charging circuit 600 is disabled whenever power consumption has to be restricted in order to maximize power to other components such as the motor 400, and/or image sensor 500. Positive terminal 710 of battery 700 is connected to a switch 800, which is controlled by an input signal from bus 120. The output of switch 800 is connected through a low voltage diode 810 to bus 128. The primary function of switch 800 is to electrically isolate terminal 710 from bus 128 whenever scanning device 190 is physically disconnected from USB host 92.

In operation, scanning device 190 is linked to USB host 92 through USB cable 91 attached to USB connector 100. Power is supplied from USB cable 91 as a 5V source to scanning device 190 at bus 120. An output 610 of charging circuitry 600 supplies power to positive terminal 710 of battery 700, and charges battery 700 to a maximum voltage of approximately 4.8V. Bus 120 is connected through diode 124 to bus 128. Bus 128 supplies power to USB interface processing circuitry 200. The voltage on bus 120 is 'high' (5V) and turns on switch 800 which electrically connects positive terminal 710 of battery 700 to bus 128 through diode 810. When scanning device 190 is physically disconnected from USB host 92, bus 120 goes 'low' (0V) and switch 800 turns off, disconnecting positive terminal 710 of battery 700 from bus 128.

When scanning device 190 is connected to USB host 92, power is available on bus 120, and scanning device 190 goes into a standby mode. In the standby mode, scanning device 190 is operational, communicating with USB host 92, and ready to scan an input document when the appropriate scan command is sent from USB host 92 to scanning device 190. In standby mode, motor 400 and image sensor 500 are both off, consuming minimal power. In standby mode, power is consumed primarily by charging circuitry 600 (approximately 0.5 W), USB interface processing circuitry 200 and scanner and control processing circuitry 300 (approximately 1.2 W). The total power consumed in standby mode is relatively low, about 1.7 W, which is less than the USB maximum allowable of 2.5 W. Thus, in standby mode, the voltage at bus 120 is constant at 5V, and diode 124 is forward biased (on); bus 128 is held at approximately 4.5V, and power for the scanning device 190 is fully supplied from USB cable 91 through bus 120. The relatively high voltage (4.5V) at bus 128 shuts off any current flow from battery 700 through diode 810.

When a scan command is sent from USB host 92, scanning device 190 enters into scan mode. In scan mode, motor 400 and the image sensor module 500 are both energized for the scan operation. Image sensor 500 typically consumes about 0.5 W of power for a single sided scanning device, and about 1.0 W for a duplex device. Motor 400 may consume from 0.3 W to 1.0 W or more of power. Thus, the total power consumed by scanning device 190 in scan mode may exceed the maximum of 2.5 W available from USB cable 91. Scanning devices which use high torque motors and/or multiple image sensors for duplex scanning consume higher power in excess of 2.5 W.

When scanning device 190 is in scan mode, and the power consumption of scanning device 190 exceeds the 2.5 W limit available from USB cable 91, the voltage decreases from 5V at bus 120 and hence also at bus 128. This causes diode 810 to become forward biased and to turn on, which allows current to flow from battery 700 to supply power to bus 128. This power flow from battery 700 will maintain the voltage of bus 128 at approximately 4.2V-4.5V. Battery 700 thus supplies power to scanning device 190 when power consumption exceeds the maximum 2.5 W allowable limit of the USB interface. In one embodiment, charging circuitry 600 continuously charges battery 700 to the maximum level of approximately 4.8V whenever scanning device 190 is connected to USB host 92. In another embodiment, charging circuitry 600 is selectively enabled (via a signal on bus 330) to charge battery 700 only when scanning device 190 is in standby mode; charging circuitry 600 is disabled when scanning device 190 is in scan mode.

Figure 3:
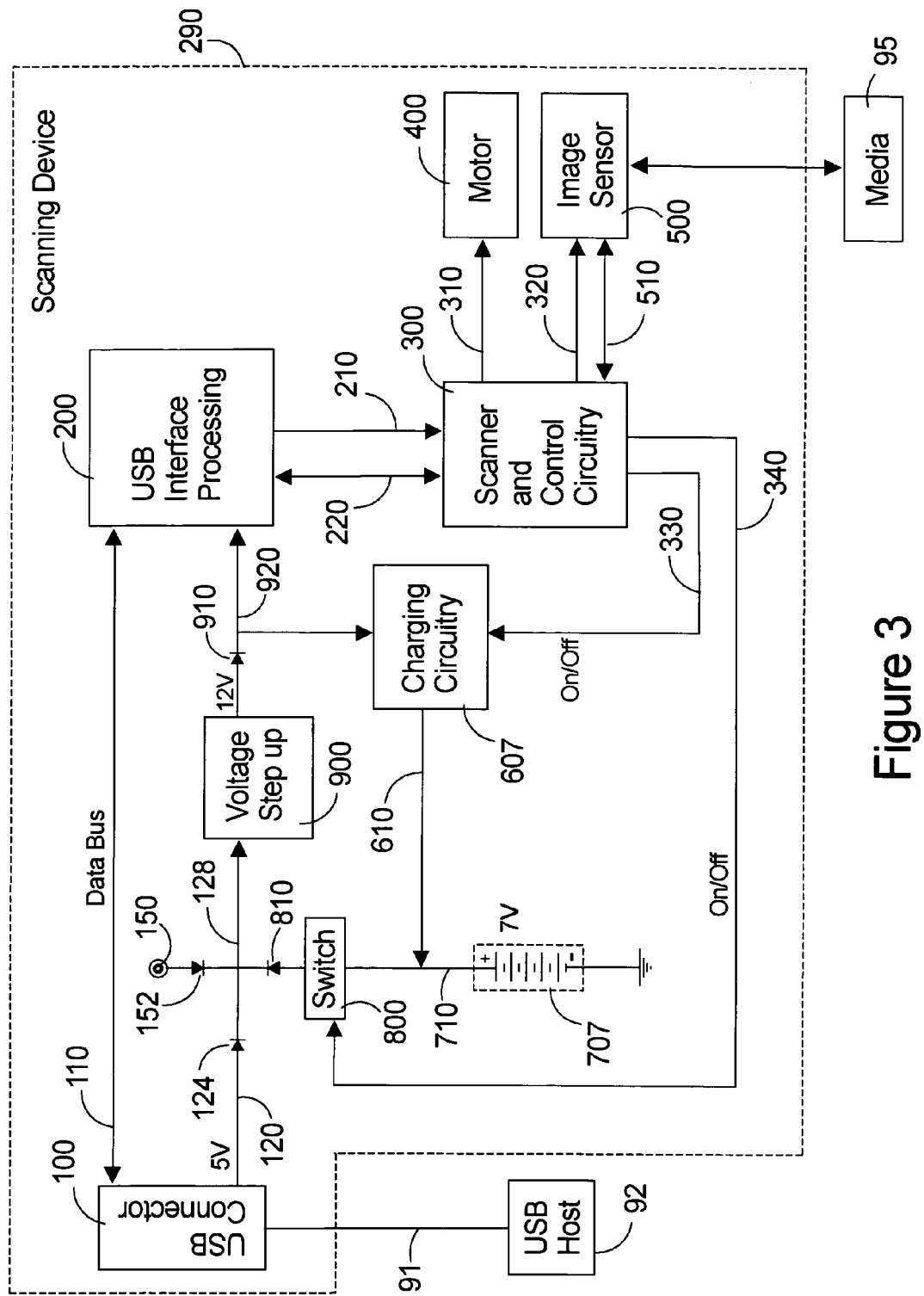
FIG. 3 shows a block diagram of an embodiment of a USB powered scanning device incorporating a voltage step up unit, and that operates on power drawn from a USB interface and from a rechargeable battery source in accordance with an embodiment of the invention.

In an alternate embodiment of the invention, scanning device 190 is modified to produce a scanning device 290, shown in FIG. 3. Scanning device 290 interfaces to USB host 92 through USB cable 91. Scanning device 290 operates on power drawn either from an external 12V power supply, or from USB cable 91 and a rechargeable battery 707. Scanning device 290 includes a voltage step up unit 900. The higher operating voltage of scanning device 290 allows scanning device 290 to incorporate the use of a more efficient and higher torque motor 400, and also use a higher voltage (7V) for rechargeable battery 707.

As shown by FIG. 3, the input to voltage step up unit 900 is the power source with the highest voltage at bus 128. In operation, when an external 12V power source is plugged in at an input jack 150, bus 128 is driven high to approximately 11.5V. This causes diodes 124 and 810 to be reversed biased, and effectively shuts out input power to bus 128 from USB cable 91, and from the battery 707. In this case, scanning device 290 operates on power drawn exclusively from the 12V external source connected at input jack 150.

When an external 12V power source is not available, scanning device 290 operates on power drawn from USB cable 91 and from battery 707. Voltage step up unit 900 draws from a 4.5V to 12V variable input voltage on bus 128 and steps up the voltage to a fixed 12V output to diode 910. Charging circuitry 607 is a current limiting circuit that supplies current to charge battery 707 to a maximum voltage of approximately 7V at a positive terminal 717. Charging circuitry 607 is selectively enabled by means of a control signal on bus 330 from the scanner and control circuitry 300. Battery 707 is connected to switch 800. Switch 800 is controlled by an input control signal on bus 340 from scanner control circuitry 300. In one embodiment, switch 800 is enabled only when motor 400 or the image sensor 500, or both are turned on. Otherwise, switch 800 is disabled.

In operation, when scanning device 290 is plugged into USB host 92, scanning device 290 is energized by 5V power from USB cable 91 on bus 120. This 5V input voltage is increased to 12V at voltage step up unit 900, and supplies power to the rest of scanning device 290 through bus 920. When scanning device 290 is in standby mode, scanner and control circuitry 300 turns off switch 800 (via control signal 340), and scanning device 290 runs entirely on power supplied by USB cable 91. In this standby mode, charging circuitry 607 is enabled and battery 707 is charged to the maximum preset voltage of 7V. The preset voltage is a design choice and depends on the number of battery cells used in battery 707, and the output voltage of voltage step up unit 900.

When USB host 92 sends a signal to scanning device 290 to scan a document, scanning device 290 transitions from standby mode to scan mode. First, scanner and control circuitry 300 turns off charging circuitry 607 via the control signal on bus 330 and turns on switch 800 to enable battery 707 to provide power to scanning device 290. Next, motor 400 and image sensor 500 are energized, and scanning device 290 scans an input document placed on scanning device 290. After the scan operation is completed, motor 400 and image sensor 500 are turned off. Then switch 800 is turned off to disconnect the battery power from scanning device 290, and charging circuitry 607 is enabled. In this way scanning device 290 returns to standby mode.

The foregoing discussion discloses and describes merely exemplary methods and embodiments. As will be understood by those familiar with the art, the disclosed subject matter may be embodied in other specific forms without departing from the spirit or characteristics thereof. Accordingly, the present disclosure is intended to be illustrative, but not limiting, of the scope of the invention, which is set forth in the following claims.

We claim:

1. A scanning device, comprising:
    an internal power bus;
    a bus interface for connecting to an external host bus, the bus interface forwarding a power signal from the external host bus to the internal power bus when the external host bus is connected to the bus interface;
    a motor used for moving media with respect to the scanning device;
    an image sensor used to scan the media;
    a rechargeable battery;
    charging circuitry that draws power from the internal power bus and charges the rechargeable battery; and
    a switch, separate from the charging circuitry, that connects the rechargeable battery to the internal power bus, the switch being turned on and allowing connection between the rechargeable battery and the internal power bus whenever the external host bus is connected to the bus interface and the switch being turned off and preventing connection between the battery and the internal power bus whenever the external host bus is not connected to the bus interface.

2. A scanning device as in claim 1 wherein the external host bus is a Universal Serial Bus (USB).

3. A scanning device as claim 1, additionally comprising:
    an input for an external power source, the input allowing the external power source to supply power for operation of the motor and the image sensor.

4. A scanning device as claim 1, additionally comprising:
    a diode located between the switch and the internal power bus allowing current to flow between the rechargeable battery on the internal power bus only when a voltage across the rechargeable battery is greater than a voltage on the internal power bus.

5. A scanning device as claim 1, wherein the charging circuitry is enabled when the motor is not energized, and disabled when the motor is energized.

6. A scanning device, comprising:
    an internal power bus;
    a bus interface for connection to an external host bus, the external host bus providing a power source for the internal power bus;
    a motor used for moving media with respect to the scanning device;
    an image sensor used to scan the media;
    a battery;
    a switch that connects the battery to the internal power bus, the switch being turned on and allowing connection between the battery and the internal power bus whenever the external host bus is connected to the bus interface and the switch being turned off and preventing connection between the battery and the internal power bus whenever the external host bus is not connected to the bus interface; and
    a step up voltage unit that increases signal voltage of a combined signal that is powered both from the bus and from the battery, the step up voltage unit increasing signal voltage of the combined signal before a resulting signal is applied to at least one of the motor and the image sensor.

7. A scanning device as in claim 1 wherein the image sensor is capable of scanning both sides of the media.

8. A scanning device as in claim 6, additionally comprising:
    a power input jack, wherein when an external power source is connected to the power input input, the scanning device operates on power drawn exclusively from the external power source.

9. A scanning device as claim 4, additionally comprising:
    a second diode on the internal power bus between the switch and the charging circuitry, the second diode preventing current from flowing from the rechargeable battery through the internal power bus to the charging circuitry.

10. A scanning device, comprising:
    an internal power bus;
    a bus interface for connecting to an external host bus, the bus interface forwarding a first power signal at a first voltage from the external host bus to the internal power bus when the external host bus is connected to the bus interface;
    a motor used for moving media with respect to the scanning device;
    an image sensor used to scan the media;
    a controller that controls the motor and the image sensor;
    a battery for providing a second power signal at a second voltage, the second voltage being higher than the first voltage;
    a power input jack for connecting to an external power source to the internal power bus, the external power source forwarding a third power signal at a third voltage to the internal power bus when the external power source is connected to the power input jack, the third voltage being higher than the second voltage;
    a voltage step-up that steps up voltage on the internal power bus to produce a fourth power signal with a fourth voltage, the fourth voltage being higher than the third voltage; and,
    a switch that connects the battery to the internal power bus, the switch being turned on and off by the controller.

11. A scanning device as in claim 10 wherein the controller turns the switch on when the motor and the image sensor are both being used.

12. A scanning device as in claim 10 additionally comprising:
    charging circuitry connected to the voltage step-up and the battery, the using the fourth power signal to charge the battery.

13. A scanning device as in claim 12 wherein the controller controls the charging circuitry, the controller turning the charging circuitry off when the motor and the image sensor are both being used.

14. A scanning device as in claim 10 wherein the first voltage is approximately 5 volts, the second voltage is approximately 7 volts, the third voltage is approximately 11.5 volts and the fourth voltage is approximately 12 volts.

15. A scanning device as in claim 10 additionally comprising:
    a first diode used to connect the bus interface to the internal power bus;
    a second diode used to connect the switch to the internal power bus; and,
    a third diode used to connect the power input jack to the internal power bus.

* * * * *